United States Patent Office 3,486,906
Patented Dec. 30, 1969

3,486,906
WATER-DISPERSIBLE HOP FLAVORS FOR MALT BEVERAGES AND THE LIKE
Paul H. Todd, Jr., Kalamazoo, Mich., assignor to Kalamazoo Spice Extraction Company, Kalamazoo, Mich., a corporation of Michigan
No Drawing. Filed Mar. 1, 1965, Ser. No. 436,330
Int. Cl. C12c 9/02
U.S. Cl. 99—50.5
75 Claims

ABSTRACT OF THE DISCLOSURE

Composition comprising an isohumulone and propylene glycol or glycerine, preferably propylene glycol, the pH of the composition being about 3–11, which may contain water, preferably in amount up to about 25% by weight; generally contains about 5–30% by weight of isohumulone, usually 15–25% by weight of isohumulone, with balance being solvent including water (when present). Essential oil of hop may also be present and is emulsified by the isohumulone. The compositions are stable suspensions which form a clear colloidal solution when used to flavor an aqueous beverage. Process of flavoring beverages using these compositions, and beverages flavored therewith, are also a part of the invention. Starting isohumulone is preferably molecularly distilled or filtered using diatomaceous earth.

---

The present invention relates to water-dispersible hop flavors and is more particularly concerned with water-dispersible flavoring compositions comprising an isohumulone, a method of making the same, and a method of utilizing the same in the flavoring of malt beverages such as beer or ale.

It has been known for many years that two of the important flavors contributed to malt beverages, e.g., beer, by use of the conventional hops are isohumulone and essential oil of hop. The isohumulone provides the characteristic bitterness to beer, and the essential oil of hop deepens and modifies the aromatic quality of the beverage.

Within recent years, it has been established that isohumulone is formed from humulone during the brewing period in which the hops are boiled in the wort. Some of the isohumulone is lost in the hot and cold breaks, but a portion, generally considered to be 25% to 30% of that theoretically available, based on the humulone content of the hops, finds its way through fermentation into the finished beverage as isohumulone. In typical beers, it is present at a level between 14 and 30 parts per million.

According to more recent brewing art, which is also the subject of recent patents, the hops are processed by solvent extraction, and the hop extract is added to the wort during the boil. Another modification of this procedure is to isomerize the total hop extract, and to add the total isomerized hop extract to the wort during the boil. Both of these procedures have the advantage over the conventional use of hops per se in that the extract is relatively stable (especially the isomerized extract) and readily stored, but they retain the disadvantage of serious losses of isohumulones, and the flavor yield over that attainable using hops per se is not markedly increased.

Moreover, in the case of the unisomerized hop extract, utilization of the hop flavors is generally no better than if natural hops are used, since no greater degree of isomerization of the alpha acids occurs than when using the hops per se, and the extract, which is a thick tar, is not readily dispersible in the wort. The preisomerized extract has the advantage over the straight extract in that the alpha acids are converted substantially to isohumulones, so that alpha acids do not appear in the wort. However, the preisomerized extract still has the disadvantage of poor dispersibility, since it is also a very tarry mass which forms globules during the boiling of the wort.

A further disadvantage of both of the two types of extract presently employed is that they carry over the lot-to-lot variation experienced with the use of hops per se, thereby contributing to non-uniformity of the beer. Precise flavor control is therefore impossible. To overcome this difficulty, brewers have adopted the practice, though inconvenient, of blending their batches of beer to increase uniformity.

In summary, in the normal brewing process, using hops added to the boiling wort, the following problems arise:

(1) batch-to-batch variation
(2) poor utilization of alpha acids due to
 (a) incomplete isomerization
 (b) precipitation in the hot and cold breaks, and adsorption on the yeast
 (c) incomplete dispersion in the wort
(3) deterioration during storage.

It has been pointed out that available isomerized extracts overcome difficulty 3; that preisomerized extracts overcome difficulties 2(a) and 3; but that no available extract overcomes any of the other difficulties.

Isohumulone itself has already been added to fermented beer experimentally, and has been found to have the desired bittering effect. It is also known to be alcohol soluble, and alcoholic solutions of isohumulone have therefore been used. However, they have not been found to be practical because of the high taxes on distilled alcohol. In addition, a reaction takes place between isohumulone and ethyl alcohol on storage, producing an apple-like aroma. For this reason stored alcoholic solutions of isohumulone are not stable, and cannot be used as a flavor base for malt beverages.

Other methods of adding isohumulone to beer are suggested by the techniques employed in the pickle industry, where non-ionic emulsifiers, such as the polyoxyethylene ethers of mixed partial oleic esters of sorbitol anhydrides, including Polysorbate 80 and the like, are mixed with the flavoring ingredient. We have found, however, that emulsifiers of this type are not stable in beer and soon produce a highly unpalatable flavor. Consequently, the conventional techniques of adding flavor to a beverage involving the usually acceptable emulsifiers cannot be utilized.

Prior art workers may have produced an aqueous isohumulone emulsion at a so-called "neutral" pH, but the concentration of the isohumulone in their product was at best only about 18.3 pounds per 74 gallons (ca. 3% by weight), whereas the concentration of isohumulone in the compositions of the present invention can readily be made as high as 20% by weight or even greater, e.g., 30% by weight. Morevore, these prior art workers found it necessary to employ an emulsifier, which is not necessary or desirable according to the present invention, as emulsifiers are inherently unsuitable for incorporation in any flavor concentrate for use in flavoring a beverage inasmuch as they generally introduce a completely unpalatable taste, as pointed out previously.

The isohumulone itself, and its hydrogenated and/or reduced derivatives, are thick, viscous liquids, gums, pastes, or solids, and cannot be added to a beverage directly. They must therefore be diluted. To minimize handling and shipping expenses, any diluted mixture should still remain fairly concentrated.

In short, then, isohumulone cannot be added to beer or other malt beverage in the form of an alcohol solution thereof, since the isohumulone reacts with the alcohol, thus rendering storage of any alcohol solution or suspension thereof impossible. It is possible to place isohumulone into aqueous solution by making it highly basic, but this destroys the natural pH of the beer which is usually pH 4–6. It has, moreover, been found that addition of an emulsifying agent produces a satisfactory emulsion or dispersion, but that commonly employed physiologically acceptable emulsifying agents deteriorate in the beverage and give off highly unpalatable flavors. Isohumulone can be dispersed or dissolved in propylene glycol or glycerine, but this is an unsatisfactory medium for dissolving or dispersing the isohumulone in a beverage because such solutions or suspensions will not go into solution in water or aqueous beverage but rather gum out and present a further problem. However, at a proper pH, it has been found that the isohumulone readily disperses in propylene glycol or glycerine and that the resulting suspension or solution may be readily diluted and goes readily into colloidal solution in water or the aqueous beverage desired to be flavored therewith. The natural pH of the propylene glycol and isohumulone, whether per se or a hydrogenated and/or reduced derivative thereof, is usually around pH of 2, but the pH of the compositions of the invention must be adjusted so as to be above a pH of 3, and preferably 3.8 or greater, so as to allow elimination of the emulsifying agent and still produce a concentrated dispersion of the isohumulone which is moreover readily dispersible in water or the malt beverage desired to be flavored therewith. The present invention, then, is based upon the fact that certain solvents at certain adjusted pH ranges are suitable media for the dispersion of an isohumulone concentrate and that the resulting compositions are readily dispersible in water or in the beverage desired to be flavored therewith. In addition, when it is desired to include essential oil of hop in the concentrate, it has been found unexpectedly that, in the compositions of the present invention, the isohumulone also acts as an effective dispersing agent for the essential oil of hop, thus enabling it too to be suitably shipped and stored and added to a malt beverage in which it is likewise readily dispersible. When employed in the flavoring of beer, the compositions are preferably and advantageously utilized after the wort boil and after fermentation so as to minimize flavor loss and give maximum controllability and reproduceability.

It is accordingly an object of this invention to provide an isohumulone composition which is sufficiently concentrated to be economically shipped and stored, which may be added directly to the beer or other beverage or, alternatively, readily diluted further before addition, and which, furthermore, is completely stable during normal periods of storage. Another object of the invention is to provide an isohumulone composition which is not significantly more costly, and which therefore enables a brewer to use economically an isohumulone in the brewing process. Another object is to provide a ready and suitable method and means for handling solutions or suspensions of isohumulone intended for flavoring malt beverages. A further object is to provide a system of an isohumulone, essential oil of hop, and diluting agent which is mutually compatible, and which meets all of the previousy mentioned requirements. Another object is to provide a means for flavor control of each batch of flavored beverage. Additional objects and advantages will become apparent hereinafter, and still others will be apparent to one skilled in the art.

Very briefly, it has been discovered that a solution of an isohumulone in propylene glycol or glycerine, which solution registers a pH of greater than 3, and preferably above 3.8, and which may contain water, meets all of these requirements. It should be pointed out that if the pH of the propylene glycol or glycerine is below 3, the system is not satisfactory, so pH is critical to this invention. Hop oil may be mixed with the propylene glycol or glycerine-isohumulone-water system in proportion to the isohumulone content, the exact amount depending upon the type of product desired, although more than 25% water reduces its solubility to a usually undesirable extent. Ten to 20% of water by weight, 15 to 25% by weight of isohumulone, and the balance propylene glycol or glycerine, are the preferred ranges. Broader ranges are water up to about 30%; isohumulone about 5 to 30%; propylene glycol or glycerine-balance.

This system may be added to water or an aqueous beverage. It is in the form of an oil-in-water emulsion if the isohumulone concentration is above about five percent by weight of the aqueous solution, i.e., in the beverage, which is the maximum concentration of isohumulone which will dissolve in water, and in the form of a colloidal suspension at lower concentrations (i.e., if the concentration is below about 5 percent). If the system contains essential oil of hop together with isohumulone, then hop oil emulsions always result. At still lower concentrations, e.g., 20 p.p.m., as are ordinarily used in beverages, isohumulone forms a colloidal solution in water or aqueous beverage but, more significantly, it also acts as an emulsifying agent for the essential hop oil even at such lower concentrations. Thus, a flavoring system utilizing an isohumulone as the emulsifying agent for essential hop oil has been found. This result is also new and previously unreported in the art.

The following examples are given by way of illustration only and in no event are to be construed as limiting. An example of this invention is as follows:

PREPARATION A

Representative example of a hop extraction process involving removal of volatile hop oils, followed by isomerization and isolation of the nonvolatile-nonisomerizable (NVNI) fraction:

(A) Fresh hops (1000 g.) were dried, ground, and exhaustively extracted with hexane. Removal of the solvent by distillation provided a concentrated micella, which was steam-distilled to provide a hop oil fraction.

(B) Water was added to the residue from the steam distillation in A to bring the total volume to ca. 2 liters. The pH was adjusted to 10–11 with a phosphate buffer and the solution was kept at a temperature between 89 and 97° C. for 30–90 minutes and then poured into sufficient cold 5% hydrochloric acid to lower the pH to 2.5. The precipitated materials were extracted with methylene chloride and the methylene chloride layer was dried with sodium sulfate and the solvent removed by distillation to provide a preisomerized hop extract rich in isohumulone.

COMMENTS (A)

(1) Hops do not have to be fresh, dried, or ground.
(2) Prior art shows solvent can also be most organic solvents, e.g., ethanol, halogenated hydrocarbons, other hydrocarbons, e.g., heptane, benzene, ether, acetone, methanol.

(B)

(1) pH not limited to 10–11. May be pH of 9–13.
(2) Phosphate not limiting. Use any base: NaOH, $NaHCO_3$, $Na_2CO_3$, etc.
(3) Temperature and time not limiting. Lower temperature means longer reaction period. Higher temperature, shorter period.
(4) May be acidified with any water-soluble acid, e.g., $H_2SO_4$.
(5) Methylene chloride and pH of 2.5 are not limiting. Other water-immiscible solvents and pH's of 4 or below may be employed.

Example 1

Isohumulone (116 g.) of 95% spectral purity, 333 g. of propylene glycol, and 100 g. of water containing 9 grams of sodium carbonate were warmed and stirred. The pH was 4.1 on a pH meter. To this mixture was added 1.73 g. of essential oil of hop.

This mixture was stored under refrigeration and at room temperature for nine months, and no change in spectral or flavor characteristics was noted. Thus, the mixture was completely stable. An alcoholic solution stored under similar conditions had developed a strong off-flavor.

When used to flavor beer by addition thereto after fermentation, a fine clear, cloudless dispersion in the beer resulted.

The concentrated mixture, containing 20% isohumulone, is metered directly into an aqueous malt beverage, e.g., beer, at a post-boil post-fermentation stage. To obtain 20 p.p.m. of isohumulones, a portion thereof is diluted 10,000 times. Obviously, precise equipment is required to meter in such a small amount, and a preferable manner of handling the flavor is as follows:

One part of the flavor is mixed into 9 parts of water. A fine stable emulsion is formed. The isohumulone is present at a 2% level in this emulsion, and is metered into the beer at a more readily controlled dilution of one part to 1000 parts. The beverage product is entirely clear and has a highly desirable hop flavor.

Thus, the flavor system provided by this invention allows for complete flexibility in its operation.

A variation on this example is to mix the isohumulone, hop oil, and propylene glycol together at a pH above 3, e.g., a pH of 4.1, to form a viscous concentrated liquid solution, and then to add alkali (in amount of about 1.1 molar equivalents of 1 N NaOH to neutralize the isohumulone) and water to the resulting solution after the mixture has been received at the brewery. The fine, stable emulsion can then be metered directly into the sweet beer. This procedure has the advantage of reducing freight and reduced possibility of air oxidation or evaporation due to a cracked cover or incomplete seal.

As previously stated, one of the objects of this invention is to overcome difficulty 2(c), incomplete dispersion in the wort, and other objects are to overcome difficulties 1 and 2(b), as such difficulties are outlined in the foregoing. It has been found that difficulty 2(c) mentioned in the foregoing can also be overcome by blending a preisomerized hop extract with propylene glycol, an raising the pH of the mixture to a minimum of 3, preferably at least 3.8, and preferably to 7. The pH alteration conveniently can be effected, e.g., with a concentrated (20%) solution of sodium hydroxide.

An example is as follows:

Example 2

A preisomerized extract, containing 40% isohumulone (100 g. total weight) was warmed to fluidity, and 50 g. of propylene glycol was added. Ten ml. of 40% NaOH was added, the pH of the mixture being 6.5 (different hop extracts will require different amounts of sodium hydroxide or other suitable base). The percentage of isohumulone in the concentrate was 25% by weight. This mixture when added to warm water, readily disperses into a fine emulsion, and does not form globules as does the plain preisomerized extract. Thus, the isohumulone is dispersed completely in the wort with this preparation. The only loss in the brewing process is due to adsorption on materials falling out in the breaks, or on the yeast.

Another similar composition containing 46% preisomerized hop extract, 53% propylene glycol, and 1% of 30% weight by weight aqueous sodium hydroxide, having a pH of 7, was found to be ideally suited for the intended purpose.

In order to overcome disadvantages 1 and 2(b) mentioned above, isohumulone itself must be used, rather than a preisomerized hop extract containing the same. As is well known to one versed in the brewing art, a preisomerized hop extract composition must be added during the wort boil or shortly thereafter, whereas a pure isohumulone composition can be introduced into the beverage at any point before sealing the container.

A further example is as follows:

Example 3

The pH of a 5% solution of isohumulone in propylene glycol was raised from pH 2 to pH 10.7 by the addition of 20% sodium hydroxide, and the final concentration adjusted to 4% isohumulone by addition of propylene glycol. A portion of this sample was diluted with equal parts of water, to give a 2% solution of lower viscosity than the propylene glycol solution, and therefore more readily dispersible in a beverage. Both samples were stored for nine months, assayed and tasted. No deterioration had occurred in either sample. Both are used to flavor a malt beverage (beer) by introduction thereinto after fermentation, and the sparking product has a highly desirable hop flavor.

This demonstrates the remarkable stability of isohumulone in the present system. It is known that isohumulone forms the valueless, harshly bitter humulinic acid at these pH's in aqueous systems, and the unexpected stability in the presence of glycerine or propylene glycol cannot be explained. It should also be pointed out that essential hop oil could possibly lose flavor quality at this pH, so that a pH in the range of Example 1 is preferred, especially when essential hop oil is present.

This example moreover illustrates another feature of the invention—the use of water in the system to reduce the viscosity, which facilitates dispersion and solution in the beverage. The compatibility and storability of the system in the presence of such large amounts of water, at unlikely pH's, is important to its usefulness. However, the higher pH ranges do not constitute the preferred embodiment of the invention, even in the absence of hop oil, since they will alter the pH of the beer. The system in Examples 1 and 2, i.e., a pH of 3 to 7, will not measurably affect the pH of the beer, and therefore is ideal from this standpoint.

It should be pointed out that glycerine and propylene glycol are very inexpensive edible solvents, which are permitted as non-alcoholic solvents for flavors such as vanilla. Ordinarily, such solutions are very dilute—on the order of one percent flavor or less, and they are also known to be stable in alcohols. Since propylene glycol and glycerine are polyhydric alcohols, it would be expected that isohumulone would also be unstable in them as well as in other alcohols, particularly after the addition of alkali. It is obvious from the foregoing examples that this is not the case.

In addition, it should be pointed out that the pH is critical to this invention in that it cannot be reduced below 3, preferably 3.8, and a satisfactory dilution effected. This is not the case with other propylene glycol based flavors, in which the glycol is merely a substitute for alcohol. The unexpected propylene glycol stability is also fundamental to the practicality of this invention.

The emulsifying effect of an isohumulone on hop essential oil is best illustrated by the following example, which also illustrates a further variation of this invention:

Example 4

A 20% solution of isohumulone in propylene glycol, at a pH of 5, is stirred into warm water, to make a 2% solution. Hop essential oil is added, with stirring, to make a 0.1% emulsion of oil. The resulting emulsion will produce a beer flavored with 20 parts per million of isohumulone and 0.5 part per million of oil when diluted 1000 times. This illustrates the usefulness of isohumulone as an emulsifying agent for the hop essential oil.

Example 5

One gram of the cloudy suspension of slightly impure isohumulone prepared by isomerization of a hop micella followed by selective extraction of the nonvolatile, nonisomerizable fraction, was dissolved in ten ml. of 95% ethanol and then neutralized by the addition of three ml.

of 1 N aqueous NaOH solution. To the resulting red solution was added 100 ml. of a 2% aqueous solution of $Na_3PO_412H_2O$. Adjusting the pH of the resulting amber solution to 6.0–6.5 (preferably 6.1) gave a slightly cloudy, pale yellow suspension. To the well-stirred suspension was added 0.5–1 g. of Celite diatomaceous earth filter-aid, and this mixture was filtered through a 2 mm. pad of filter aid prepared from a slurry of filter aid in water. Methylene chloride (50 ml.) was added to the clear filtrate, and the pH of the rapidly stirred mixture was lowered to 1.5–2.0 (preferably 1.7). After re-extraction of the separated aqueous layer with additional methylene chloride, the combined organic layers were dried with solid $Na_2SO_4$, filtered, and concentrated on a steam bath at atmospheric pressure. Last traces of solvent were removed on a rotary evaporator at 100°/12 mm. This process left 0.98 g. of clear, light amber isohumulone as a viscous oil.

This oil, when stored under nitrogen in a sealed container, is stable indefinitely at room temperature. Blending of this oil with propylene glycol and adjusting the pH to 4.1 as in the previous examples, and then dispersing in water or beer, according to Example 4, results in a perfectly clear solution, with no traces of cloudiness. The taste of the beverage product flavored therewith is excellent.

Example 6

In the same manner as given hereinbefore in Examples 1, 3, or 4, a composition is prepared in all respects the same as in the preceding examples except that dihydroisohumulone replaces the humulone. The results are identical.

Example 7

In the same manner as given hereinbefore in Examples 1, 3, or 4, a composition is prepared in all respects the same as in the preceding examples except that tetrahydroisohumulone replaces the humulone. The results are identical.

Example 8

In the same manner as given hereinbefore in Examples 1, 3, or 4, a composition is prepared in all respects the same as in the preceding examples except that hexahydroisohumulone replaces the humulone. The results are identical.

Example 9

In the manner of the preceding examples, compositions are prepared and malt beverages are flavored therewith, the sole difference being that glycerine replaces the propylene glycol. The results are in all respects the same, except that the propylene glycol compositions in the malt beverage produce colloidal solutions which are entirely clear and cloud-free, whereas a coarser type of semicolloidal solution or suspension appears to be produced when using the glycerine compositions.

Example 10

Compositions are produced in accord with the foregoing examples from propylene glycol or glycerine, water, and isohumulone or the di, tetra, or hexahydro derivative thereof, in each case at a pH above 3. It is found that the preferred pH range is between about 3.8 and 7 and that the preferred water content is between about 10 and 20 percent by weight of the composition. Higher pH's, up to 8.5, are objectionable only in that they may alter the natural pH of the beer, unless the beer is abnormally acid to begin.

Upon further dilution and metering into an aqueous malt beverage, after fermentation thereof, a satisfactorily clear dispersion of the isohumulone composition in the malt beverage and suitable flavoring characteristics are uniformly obtained.

Example 11

In the manner of the preceding example, the same compositions are prepared with the exception that they contain, as an additional ingredient, essential hop oil. The results are identical, the isohumulone acting as emulsifying agent for the hop essential oil. The ultimate dispersion of the isohumulone composition in the malt beverage is satisfactorily clear and without globules. The aqueous malt beverage flavored therewith is entirely clear and satisfactory and the flavor of the resulting beverage is excellent. The coloring of the resulting beverage is also highly desirable due to the presence of the essential oil of hop.

Example 12

In the same manner as given in Examples 1, 3, or 4, but using instead either molecularly distilled isohumulone or a solution thereof, the molecularly distilled isohumulone having a purity of at least 95%, a superior composition is produced. The solubility of the isohumulone appears to be significantly increased by molecular distillation and, in addition, the time required to reach maximum solubility is greatly reduced. Employment of the aqueous solution-suspension of the isohumulone in the flavoring of a malt beverage produces a sparkling crystal-clear beer which is completely cloud-free. The beer moreover has a desirable full hop flavor by virtue of the isohumulone composition dispersed therein.

In this specification, as is common in the art, the terms isohumulone, dihydroisohumulone, tetrahydroisohumulone, and hexahydroisohumulone are used to represent closely related families of compounds rather than individual molecular structures. For example, in each of these structures, there is a group —CO—R. When the R in the isohumulone structure is —$CH_2$—$CH(CH_3)_2$, the isohumulone compound is named isohumulone. When R in this structure is —$CH(CH_3)$—$CH_2CH_3$, the isohumulone compound is named isoadhumulone. When R is —$CH(CH_3)_2$, the compound is named isocohumulone. The compounds generally exist in admixture. In addition, the names given include all possible optical isomers and mixtures of stereo isomers. The dihydro-, tetrahydro-, and hexahydroisohumulones have a reduced carbonyl group, two hydrogenated ethylene groups, and two hydrogenated ethylene groups and a reduced carbonyl group, respectively. As used herein, therefore, the term "an isohumulone" includes not only isohumulone per se but also isohumulone having reduced carbonyl and/or hydrogenated ethylene groups.

The flavoring materials of the present invention, especially when in pure or substantially pure form, find application not only in the flavoring of fermented beverages, such as malt beverages, e.g., beer or ale, but also in the flavoring of nonfermented and nonmalt beverages, for example imitation malt beverages, e.g., "near-beer," "root-beer," or any other beverage in which a hop or hop-like flavor is desired, either alone or in combination with other flavor ingredients.

Various modifications and equivalents will be apparent to one skilled in the art and may be made in the compounds, compositions, methods, and procedures of the present invention without departing from the spirit or scope thereof, and it is therefore to be understood that the invention is to be limited only by the full scope which can be legally attributed to the appended claims.

I claim:

1. A composition comprising an isohumulone, water and a solvent selected from the group consisting of propylene glycol and glycerine, the pH of the composition being at least 3 and not greater than about 11.

2. A composition of claim 1, wherein the pH is between about 3.8 and about 7.

3. A composition of claim 1, wherein the water content is up to about 25 percent by weight.

4. A composition comprising an isohumulone, proppylene glycol, and water in an amount up to about 25 percent by weight, the pH of the composition being between about 3.8 and about 7.

5. A composition comprising an isohumulone and a solvent selected from the group consisting of propylene glycol and glycerine, the pH of the composition being at least 3 and not greater than about 11.

6. A composition of claim 5, wherein the pH is between about 3.8 and about 7.

7. A composition comprising an isohumulone and propylene glycol, the pH of the composition being between about 3.8 and about 7.

8. The composition of claim 1 containing as an additional ingredient essential oil of hop.

9. The composition of claim 4 containing as an additional ingredient essential oil of hop.

10. The composition of claim 5 containing as an additional ingredient essential oil of hop.

11. The composition of claim 7 containing as an additional ingredient essential oil of hop.

12. A palatable beverage flavored with a composition of claim 4.

13. A palatable beverage flavored with a composition of claim 7.

14. A palatable beverage flavored with a composition of claim 9.

15. A palatable beverage flavored with a composition of claim 11.

16. The process of flavoring a beverage to produce a clear colloidal solution of isohumulone therein which comprises the step of introducing into the beverage an amount of a composition of claim 1 effective to produce the desired degree of bitterness.

17. The method of claim 16, wherein the beverage flavored is fermented beverage and wherein the flavoring composition is introduced thereinto after fermentation.

18. The process of flavoring a beverage to produce a clear colloidal solution of isohumulone therein which comprises the step of introducing into the beverage an amount of a composition of claim 4 effective to produce the desired degree of bitterness.

19. The method of claim 18, wherein the beverage flavored is a fermented beverage and wherein the flavoring composition is introduced thereinto after fermentation.

20. The process of flavoring a beverage to produce a clear colloidal solution of isohumulone therein which comprises the step of introducing into the beverage an amount of a composition of claim 5 effective to produce the desired degree of bitterness.

21. The method of claim 20, wherein the beverage flavored is a fermented beverage and wherein the flavoring composition is introduced thereinto after fermentation.

22. The process of flavoring a beverage to produce a clear colloidal solution of isohumulone therein which comprises the step of introducing into the beverage an amount of a composition of claim 7 effective to produce the desired degree of bitterness.

23. The method of claim 22, wherein the beverage flavored is a fermented beverage and wherein the flavoring composition is introduced thereinto after fermentation 24. The process of flavoring a beverage to produce a clear colloidal solution of isohumulone therein which comprises the step of introducing into the beverage an amount of a composition of claim 8 effective to produce the desired degree of bitterness.

25. The method of claim 24, wherein the beverage flavored is a fermented beverage and wherein the flavoring composition is introduced thereinto after fermentation.

26. The process of flavoring a beverage to produce a clear colloidal solution of isohumulone therein which comprises the step of introducing into the beverage an amount of a composition of claim 9 effective to produce the desired degree of bitterness.

27. The method of claim 26, wherein the beverage flavored is a fermented beverage and wherein the flavoring composition is introduced thereinto after fermentation.

28. The process of flavoring a beverage to produce a clear colloidal solution of isohumulone therein which comprises the step of introducing into the beverage an amount of a composition of claim 10 effective to produce the desired degree of bitterness.

29. The method of claim 28, wherein the beverage flavored is a fermented beverage and wherein the flavoring composition is introduced thereinto after fermentation.

30. The process of flavoring a beverage to produce a clear colloidal solution of isohumulone therein which comprises the step of introducing into the beverage an amount of a composition of claim 11 effective to produce the desired degree of bitterness.

31. The method of claim 30, wherein the beverage flavored is a fermented beverage and wherein the flavoring composition is introduced thereinto after fermentation.

32. The process of flavoring a beverage which comprises the step of diluting a composition of claim 1 with water to produce a composition having an isohumulone content between about 0.5 and 5% by weight and employing the thus-diluted composition for flavoring of the beverage by direct addition thereto.

33. The process of flavoring a beverage which comprises the step of diluting a composition of claim 4 with water to produce a composition having an isohumulone content between about 0.5 and 5% by weight and employing the thus-diluted composition for flavoring of the beverage by direct addition thereto.

34. The process of flavoring a beverage which comprises the step of diluting a composition of claim 5 with water to produce a composition having an isohumulone content between about 0.5 and 5% by weight and employing the thus-diluted composition for flavoring of the beverage by direct addition thereto.

35. The process of flavoring a beverage which comprises the step of diluting a composition of claim 7 with water to produce a composition having an isohumulone content between about 0.5 and 5% by weight and employing the thus-diluted composition for flavoring of the beverage by direct addition thereto.

36. The process of flavoring a beverage which comprises the step of diluting a composition of claim 8 with water to produce a composition having an isohumulone content between about 0.5 and 5% by weight and employing the thus-diluted composition for flavoring of the beverage by direct addition thereto.

37. The process of flavoring a beverage which comprises the step of diluting a composition of claim 9 with water to produce a composition having an isohumulone content between about 0.5 and 5% by weight and employing the thus-diluted composition for flavoring of the beverage by direct addition thereto.

38. The process of flavoring a beverage which comprises the step of diluting a composition of claim 10 with water to produce a composition having an isohumulone content between about 0.5 and 5% by weight and employing the thus-diluted composition for flavoring of the beverage by direct addition thereto.

39. The process of flavoring a beverage which comprises the step of diluting a composition of claim 11 with water to produce a composition having an isohumulone content between about 0.5 and 5% by weight and employing the thus-diluted composition for flavoring of the beverage by direct addition thereto.

40. The process of flavoring a beverage which comprises the step of including essential oil of hop in a composition of claim 1 to form an emulsion and employing the thus-formed emulsion to flavor the beverage.

41. The process of flavoring a beverage which comprises the step of including essential oil of hop in a composition of claim 4 to form an emulsion and employing the thus-formed emulsion to flavor the beverage.

42. The process of flavoring a beverage which comprises the step of including essential oil of hop in a composition of claim 5 to form an emulsion and employing the thus-formed emulsion to flavor the beverage.

43. The process of flavoring a beverage which comprises the step of including essential oil of hop in a composition of claim 7 to form an emulsion and employing the thus-formed emulsion to flavor the beverage.

44. The composition of claim 1, wherein the isohumulone is present in the composition in the form of preisomerized hop extract.

45. The composition of claim 4, wherein the isohumulone is present in the composition in the form of preisomerized hop extract.

46. The composition of claim 5, wherein the isohumulone is present in the composition in the form of preisomerized hop extract.

47. The composition of claim 7, wherein the isohumulone is present in the composition in the form of pre-isomerized hop extract.

48. The composition of claim 8, wherein the isohumulone is present in the composition in the form of pre-isomerized hop extract.

49. The composition of claim 9, wherein the isohumulone is present in the composition in the form of pre-isomerized hop extract.

50. The composition of claim 10, wherein the isohumulone is present in the composition in the form of pre-isomerized hop extract.

51. The composition of claim 11, wherein the isohumulone is present in the composition in the form of pre-isomerized hop extract.

52. The composition of claim 1, wherein the isohumulone is present in the form of molecularly distilled isohumulone.

53. The composition of claim 4, wherein the isohumulone is present in the form of molecularly distilled isohumulone.

54. The composition of claim 5, wherein the isohumulone is present in the form of molecularly distilled isohumulone.

55. The composition of claim 7, wherein the isohumulone is present in the form of molecularly distilled isohumulone.

56. The composition of claim 8, wherein the isohumulone is present in the form of molecularly distilled isohumulone.

57. The composition of claim 9, wherein the isohumulone is present in the form of molecularly distilled isohumulone.

58. The composition of claim 10, wherein the isohumulone is present in the form of molecularly distilled isohumulone.

59. The composition of claim 11, wherein the isohumulone is present in the form of molecularly distilled isohumulone.

60. The composition of claim 1, wherein the isohumulone is purified by filtration of a solution thereof using a diatomaceous earth filter aid prior to precipitation and incorporation in the flavoring composition.

61. The composition of claim 4, wherein the isohumulone is purified by filtration of a solution thereof using a diatomaceous earth filter aid prior to precipitation and incorporation in the flavoring composition.

62. The composition of claim 5, wherein the isohumulone is purified by filtration of a solution thereof using a diatomaceous earth filter aid prior to precipitation and incorporation in the flavoring composition.

63. The composition of claim 7, wherein the isohumulone is purified by filtration of a solution thereof using a diatomaceous earth filter aid prior to precipitation and incorporation in the flavoring composition.

64. The composition of claim 9, wherein the isohumulone is purified by filtration of a solution thereof using a diatomaceous earth filter aid prior to precipitation and incorporation in the flavoring composition.

65. The composition of claim 11, wherein the isohumulone is purified by filtration of a solution thereof using a diatomaceous earth filter aid prior to precipitation and incorporation in the flavoring composition.

66. The process of producing a hop flavor composition according to claim 1 which comprises mixing the named ingredients and adjusting the pH of the composition to at least 3.

67. The process of producing a hop flavor composition according to claim 4 which comprises mixing the named ingredients and adjusting the pH of the composition to between about 3.8 and 7.

68. A process of flavoring a beverage which comprises mixing the named ingredients of claim 1, adjusting the pH of the composition to at least 3, diluting with water to produce a composition having an isohumulone content between about 0.5 and 5% by weight, and employing the same in the flavoring of a beverage by direct addition thereto.

69. A process of flavoring a beverage which comprises mixing the named ingredients of claim 4, adjusting the pH of the composition to between about 3.8 and 7, diluting with water to produce a composition having an isohumulone content between about 0.5 and 5% by weight, and employing the same in the flavoring of a beverage by direct addition thereto.

70. The process of claim 67, wherein the isohumulone is purified by filtration of a solution thereof using a diatomaceous earth filter aid prior to precipitation and incorporation in the flavoring composition.

71. The process of claim 69, wherein the isohumulone is purified by filtration of a solution thereof using a diatomaceous earth filter aid prior to precipitation and incorporation in the flavoring composition.

72. A composition of claim 1, wherein the percent by weight of water is up to about 30% and the percent of isohumulone is up to about 30% by weight.

73. A composition of claim 4, wherein the isohumulone content is up to about 25% by weight.

74. A composition of claim 5, wherein the isohumulone content is up to about 30% by weight.

75. A composition of claim 7, wherein the isohumulone content is up to about 25% by weight.

References Cited

UNITED STATES PATENTS

| | | | |
|---|---|---|---|
| 1,384,681 | 7/1921 | Smith et al. | 99—140 |
| 2,435,744 | 2/1948 | Hartman | 99—140 |
| 2,754,215 | 7/1956 | Evans et al. | 99—140 |
| 3,102,813 | 9/1963 | Shore et al. | 99—52 |
| 3,155,522 | 11/1964 | Hildebrand et al. | 99—50.5 |
| 2,478,988 | 8/1949 | Wallerstein et al. | 99—48 |
| 2,952,546 | 9/1960 | Fonyo | 99—50.5 |

A. LOUIS MONACELL, Primary Examiner

NORMAN ROSKIN, Assistant Examiner

U.S. Cl. X.R.

99—28, 29